United States Patent
Fliege

(10) Patent No.: US 9,736,679 B2
(45) Date of Patent: Aug. 15, 2017

(54) SYSTEM FOR CONTROLLING A VEHICLE COMPUTER USING A MOBILE TELEPHONE

(71) Applicant: CONTINENTAL AUTOMOTIVE GMBH, Hannover (DE)

(72) Inventor: Ingmar Fliege, Wetzlar (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/429,685

(22) PCT Filed: Sep. 18, 2013

(86) PCT No.: PCT/EP2013/069335
§ 371 (c)(1),
(2) Date: Mar. 19, 2015

(87) PCT Pub. No.: WO2014/044695
PCT Pub. Date: Mar. 27, 2014

(65) Prior Publication Data
US 2015/0245198 A1  Aug. 27, 2015

(30) Foreign Application Priority Data
Sep. 20, 2012  (DE) .......................... 10 2012 216 919

(51) Int. Cl.
*H04W 8/22* (2009.01)
*H04M 1/60* (2006.01)
(Continued)

(52) U.S. Cl.
CPC .............. *H04W 8/22* (2013.01); *B60K 37/06* (2013.01); *B60R 16/023* (2013.01); *G08C 17/02* (2013.01);
(Continued)

(58) Field of Classification Search
CPC ....................................................... H04W 8/22
(Continued)

(56) References Cited

U.S. PATENT DOCUMENTS 6,628,305 B1  9/2003  Hong et al.
2007/0156311 A1*  7/2007  Elcock .................. G07C 5/008
701/31.4

(Continued)

FOREIGN PATENT DOCUMENTS

CN  102098326  6/2011
CN  102347971  2/2012
(Continued)

OTHER PUBLICATIONS

2012Q01136 DE "Fahrzeubezogene Mobile Applications Entwicklung von Smartphone Apps", http://www.audi-electronics-venture.de/aev/brand/de/projekte/fahrzeugbezogene.apps.html; Jun. 13, 2012.
(Continued)

*Primary Examiner* — Michael Neff
(74) *Attorney, Agent, or Firm* — Cozen O'Connor

(57) ABSTRACT

A vehicle computer has a vehicle display and a vehicle input device, and a mobile telephone has a mobile telephone display and a mobile telephone input device. A method for controlling the vehicle computer using the mobile telephone has the following steps: an application is run on the mobile telephone; a control command for the vehicle is entered into the application by a user using the mobile telephone input device; a software library, which can be used by multiple applications, is operated by the application; the mobile telephone is connected to the vehicle computer via a local network connection using the software library, a software interface for the software library being implemented in the vehicle computer; the control command is transmitted to the
(Continued)

software interface; and the control command is carried out by the vehicle computer.

7 Claims, 3 Drawing Sheets

(51) Int. Cl.
*H04M 1/725* (2006.01)
*G08C 17/02* (2006.01)
*B60K 37/06* (2006.01)
*B60R 16/023* (2006.01)

(52) U.S. Cl.
CPC ..... *H04M 1/6091* (2013.01); *H04M 1/72533* (2013.01); *B60K 2350/357* (2013.01); *G08C 2201/93* (2013.01)

(58) Field of Classification Search
USPC ........................................................ 455/420
See application file for complete search history.

(56) References Cited

U.S. PATENT DOCUMENTS

2009/0075624 A1    3/2009  Cox et al.

2012/0095643 A1*   4/2012  Bose ..................... B60K 37/00
                                                    701/32.8
2012/0282913 A1    11/2012 Kaindl et al.
2013/0318207 A1*   11/2013 Dotter ............... H04L 29/08117
                                                    709/219

FOREIGN PATENT DOCUMENTS

| CN | 102468864 | 5/2012 |
| CN | 102629193 | 8/2012 |
| DE | 10 2007 027231 A1 | 12/2008 |
| WO | WO 2011/046823 A1 | 4/2011 |
| WO | WO 2011/091776 A1 | 8/2011 |
| WO | WO 2011/135352 A1 | 11/2011 |
| WO | WO 2012/010210 A1 | 1/2012 |

OTHER PUBLICATIONS

Office Action dated Aug. 16, 2016 which issued in the corresponding Chinese Patent Application No. 201380048757.1.

\* cited by examiner

SYSTEM FOR CONTROLLING A VEHICLE COMPUTER USING A MOBILE TELEPHONE

CROSS-REFERENCE TO RELATED APPLICATIONS

This is a U.S. national stage of application No. PCT/EP2013/069335, filed on 18 Sep. 2013, which claims priority to the German Application No. DE 10 2012 216 919.9 filed 20 Sep. 2012, the content of both incorporated herein by reference.

BACKGROUND OF THE INVENTION

1. Field of the Invention

The invention relates to a method, a computer program and a computer-readable medium for controlling a vehicle computer and to a vehicle control system.

2. Related Art

A mirror link (also called terminal mode) of a connection between a mobile telephone or a smartphone and a vehicle computer can be used to transmit data from the screen memory of the mobile telephone to the vehicle computer. The mirror link makes it possible to display and control mobile telephone applications (apps) via the vehicle computer.

The mirror link is used to display applications on the screen of the vehicle computer in the manner in which they are displayed on the mobile telephone. It is not possible to change the user interface or adapt the user control. One solution to this problem is to write customer-specific applications for a particular vehicle computer which use particular configuration elements in a similar manner to the vehicle computer or are displayed in the same layout and style as in the user interface of the vehicle computer.

SUMMARY OF THE INVENTION

An object of the invention is to improve the interaction between a mobile telephone and a vehicle computer.

One aspect of the invention relates to a method for controlling a vehicle computer using a mobile telephone. The vehicle computer may be a head unit or a main unit, for example, and/or may be permanently installed in the vehicle, for instance in a center console of the vehicle. The vehicle may be an automobile, a truck, a bus or a motorcycle.

The vehicle computer comprises a vehicle display and a vehicle input apparatus, and the mobile telephone comprises a mobile telephone display and a mobile telephone input apparatus.

The method comprises the following steps:
an application is executed on the mobile telephone;
a user inputs a control command for the vehicle to the application using the mobile telephone input apparatus;
the application implements a software library which can be used by a plurality of applications;
the software library connects the mobile telephone to the vehicle computer using a local network connection, a software interface for the software library being implemented in the vehicle computer;
the control command is transmitted to the software interface;
the control command is executed by the vehicle computer.

The method can use a special application or software interface in the vehicle computer, which is in the form of a server, for example. The software interface visible via the network connection enables remote access to further internal software interfaces of the vehicle computer and/or to further control devices connected to the vehicle computer. The mobile telephone contains a software library which is in the form of a service, for example, which can be implemented in the background. The software library can provide access to the software interface via a wireless network connection (for example Bluetooth or WLAN).

This makes it possible to integrate a mobile telephone and, in particular, a smartphone and its applications in the software environment of the vehicle in which internal vehicle-specific interfaces for external mobile devices are provided via the external software interface.

The software library may be interpreted as a framework, the functions of which can be used to use functionalities or the software environment of the vehicle in a transparent manner with respect to the internal interfaces and the network connection.

According to one embodiment of the invention, the method also comprises the following step: the software interface controls an application in the vehicle computer using the control command. For example, this may be the remote control of applications in the vehicle computer (for instance operation of the media player, adjustment of the receiver, changing of the sound settings and the volume).

According to one embodiment of the invention, the method also comprises the following steps:
the software interface accesses a vehicle bus system to which the vehicle computer is connected; and
an electronic device in the vehicle, which is connected to the vehicle bus system, is controlled using the control command.

Depending on the equipment of the vehicle (for instance air-conditioning, door control, etc.), external devices connected to the vehicle computer can be controlled using the mobile telephone.

In addition, (internal) automobile interfaces may be made available on the mobile telephone or for developers of applications for mobile telephones. For example, the software interface may provide access to the CAN bus, MOST bus, D-bus, application interfaces, for example life cycle, the HMI, the audio system and operating system-specific interfaces. The developer can integrate his application in the vehicle environment without any problems and can benefit from additional information and the possibility of controlling the hardware in his application. The software interface on the vehicle computer and the software library on the mobile telephone may provide authorization mechanisms and/or may ensure the security of the vehicle by analyzing the access to the interfaces and the safeguarding of the correct use, for example according to the legal regulations in the respective countries.

Integration in the vehicle environment can be effected either by explicit calls of APIs for controlling components in the vehicle or by automatic mechanisms by a framework that implements the basic integration (user interface and control) of the application in the HMI of the vehicle computer. Users of these applications have the advantage of extended vehicle-specific functionalities with automatic integration in the vehicle environment since the connection to the vehicle computer can be automatically effected via a wireless connection using the CARS services.

There are a plurality of examples of mobile telephone applications which can be integrated in the software environment of the vehicle. In this case, a distinction can be made between two different application cases:

Firstly, applications on the mobile telephone can control or interact with applications in the vehicle, for example multimedia remote control, air-conditioning, media streamer for displaying images or videos on the screen of the vehicle computer, a diagnostic application for transmitting and receiving diagnostic data or logging information.

Secondly, there are mobile telephone applications that can be integrated in the display of the vehicle computer and can be displayed on this display and/or can be controlled by the input apparatus of the vehicle computer. In this case too, there are numerous applications, for example a navigation system, which can display a map on the display and/or can output guidance information (TTS) via the loudspeaker of the vehicle computer. Furthermore, there are all possible web applications, for example web radio, email reader, YouTube, Twitter, web search, storage location service or weather service, which can be integrated in the display of the vehicle computer via the mobile telephone.

According to one embodiment of the invention, the method also comprises the following steps:
diagnostic data are retrieved from an electronic device in the vehicle via the software interface;
the diagnostic data are transmitted from the software interface to the software library via the local network connection; and
the software library provides the diagnostic data for the application.

This makes it possible to use a mobile telephone to access non-customer-specific functionalities that make it possible for the vehicle manufacturer, for example during production or in the workshop, to access internal information, for example diagnostic data.

According to one embodiment of the invention, the method also comprises the following steps:
the mobile telephone application compiles user elements for a graphical user interface of the application;
the software library retrieves configuration data relating to the vehicle computer for the graphical representation of user elements used by the application via the local network connection;
the application generates a graphical user interface on the basis of the configuration data.

The software library on the mobile telephone can be used to display the user interface of the application on the display of the vehicle computer.

The software library on the mobile telephone and the software interface in the vehicle can be used to develop mobile telephone applications for vehicle computers that have automatic adaptation of the user interface (and also of the user control, see below).

The software library can be compiled together with the source code of any existing or newly developed application. The software library is coupled into the application when starting the application and can change the graphical representation or the graphical style if necessary. For this purpose, the software library communicates with the vehicle computer and can collect all necessary styles, images and interfaces in order to display the mobile telephone application in such a manner that it is similar at least to the user interface on the vehicle computer. In particular, it is possible for it to be identical to or indistinguishable from the user interface on the vehicle computer.

According to one embodiment of the invention, the method also comprises the following steps:
the software library transmits the compiled user elements to the software interface of the vehicle computer; and
a graphical user interface of the application is displayed on the vehicle display with the compiled user elements, user elements being represented using the configuration data relating to the vehicle computer.

It is also possible for the structure of the user interface on the mobile telephone to then be transmitted to the vehicle computer (using cables or wireless technology) and to be integrated in the existing user interface on the display of the vehicle computer. The user does not notice that this is actually a "remote" application.

The developer of a mobile telephone application requires only the software library or a framework which he must integrate in the development environment. There is no need to make any further changes or adaptations to the application. All adaptations needed to integrate the mobile telephone application in a vehicle computer can be made automatically.

For example, a navigation system on the mobile telephone can be extended by the software library. The application is recompiled, but no further adaptation, apart from the integration of the software library, is required. When the mobile telephone is connected to the vehicle computer, the design and style, that is to say the configuration data, of the application are automatically converted to the style of the vehicle computer, and the user can control and display the application in exactly the same manner as if it were executed on the vehicle computer. Specifically, this means that the user interface of the mobile telephone application may have exactly the same appearance as the user interface of the vehicle computer. In addition, the user can use the touchscreen and the buttons of the vehicle computer to control the application. All additional functions, for example voice output, another tone, can be carried out by the vehicle computer.

According to one embodiment of the invention, the method also comprises the following steps:
a user inputs user commands on the vehicle input apparatus;
the user commands are transmitted from the software interface to the software library via the local network connection; and
the software library transmits the user commands to the application.

Furthermore, user inputs on the vehicle computer can be transmitted back to the application on the mobile telephone. The user inputs on the vehicle computer can be transmitted back to the mobile telephone and/or can be converted there into mobile telephone inputs by the software library. This makes it possible to use the mobile telephone application in the same manner as is possible using a "mirror link", but the implementation is more flexible in comparison.

Another aspect of the invention relates to a computer program for controlling a vehicle, which, when executed on processors of a mobile telephone and of a vehicle computer, is designed to carry out the steps of the method as described above and below.

Another aspect of the invention relates to a non-transitory computer-readable medium that stores such a computer program. In this case, a computer-readable medium may be a floppy disk, a hard disk, a USB storage device, a RAM, a ROM, an EPROM.

Another aspect of the invention relates to a vehicle control system comprising a mobile telephone and a vehicle computer. In this case, the vehicle control system may be designed to carry out the method as described above and below. It should be understood that features of the method as described above and below may be features of the vehicle control system and vice versa.

BRIEF DESCRIPTION OF THE DRAWINGS

Exemplary embodiments of the invention are described in detail below with reference to the accompanying figures, in which.

In principle, identical or similar parts are provided with the same reference symbols.

DETAILED DESCRIPTION OF THE PRESENTLY PREFERRED EMBODIMENTS

Figure 1:
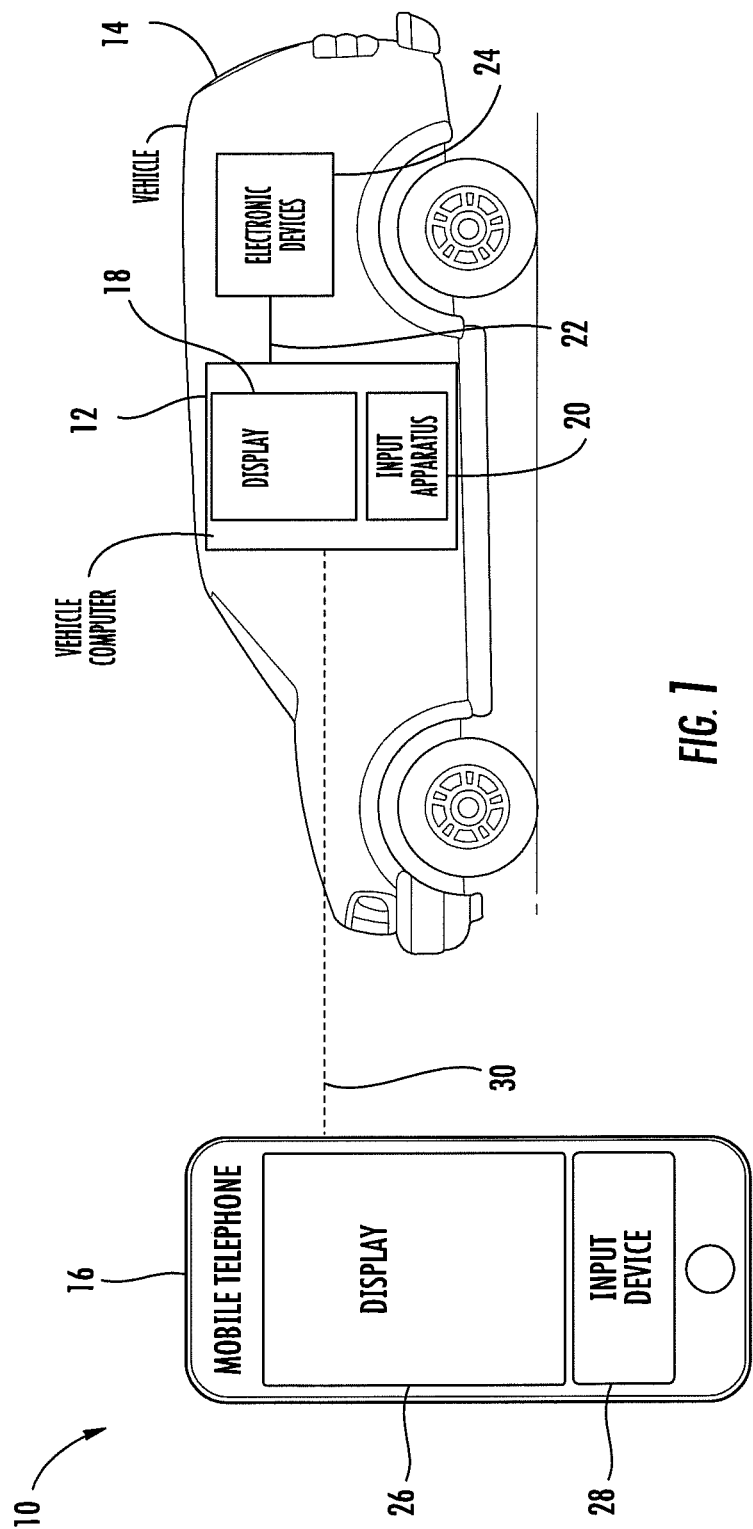
FIG. 1 schematically shows a vehicle control system according to one embodiment of the invention.

FIG. 1 shows a vehicle control system 10 comprising a vehicle computer 12, which is permanently installed in a vehicle 14, and a mobile telephone 16.

The vehicle computer 12 may comprise, for example, a head unit, which is integrated in the center console of the vehicle 14. The head unit, and therefore the vehicle computer 12, are provided with a display 18 and an input apparatus 20, which may comprise a touchscreen of the display 18, for example.

The vehicle computer 12 is connected to further electronic devices 24 of the vehicle, for instance an air-conditioning system, a radio, a CD player etc., via a bus system 22.

The mobile telephone 16 comprises a display 26 and an input device 28 which may also comprise a touchscreen of the display 26.

The mobile telephone 16 and the vehicle computer 12 are designed to communicate with one another via a local network connection 30, for instance Bluetooth or WLAN.

Figure 2:
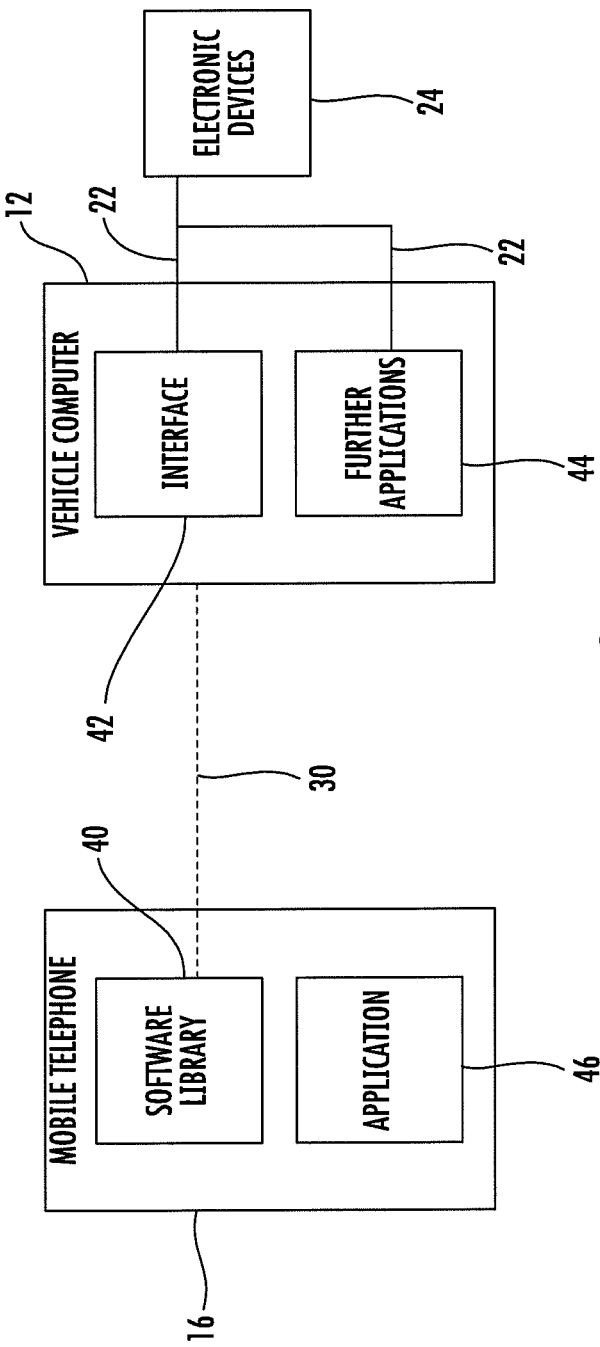
FIG. 2 schematically shows software components of the vehicle control system from FIG. 1.

FIG. 2 schematically shows software components of the vehicle control system 10.

A software library 40, which is designed to communicate with a software interface 42 installed in the vehicle computer 12 via the network connection 30, is installed in the mobile telephone 16.

The software interface 42 is configured to communicate with further applications 44, which are executed in the vehicle computer 12, and with the bus system 22.

An application 46, executed by the mobile telephone 16, can now interchange data with applications 44 or the bus system 22 by accessing the software library 40. In this case, the network connection 30 and the interface 42 become virtual for the application 46.

Figure 3:
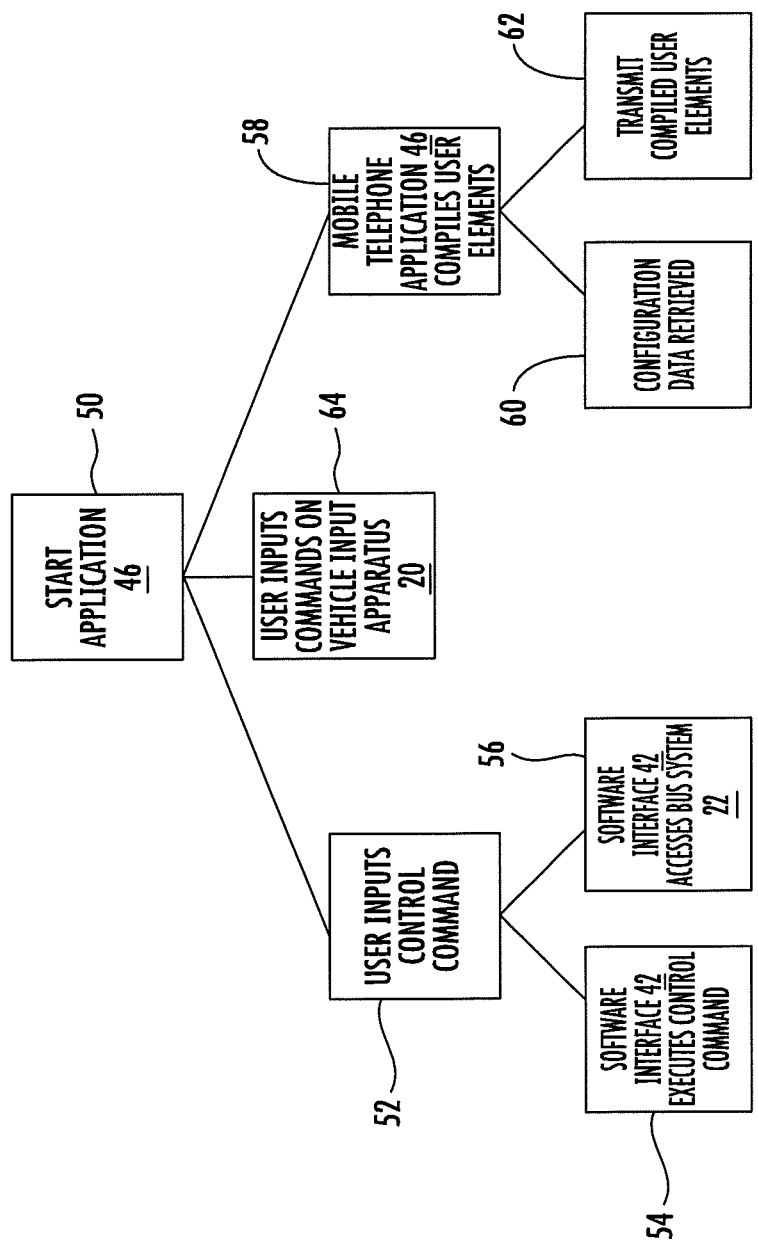
FIG. 3 shows a flowchart for controlling a vehicle computer according to one embodiment of the invention.

FIG. 3 shows a flowchart for controlling the vehicle computer 12 using the application 46.

The application 46 is started on the mobile telephone 16 in step 50. The application 46 can call functions from the software library 40 which make it possible to transfer data to the software interface 42 via the network connection 30. The functions in the software library 40 make the internal function calls of the software interface 42 transparent to the application 46.

The following steps can be carried out alternately or in any desired order.

In step 52, a user inputs a control command for the vehicle 14 to the application 46 using the mobile telephone input apparatus. This control command is transmitted from the software library 40 to the software interface 42.

In step 54, the software interface 42 can execute the control command in the vehicle computer 12 by calling a corresponding internal function of the vehicle computer 12.

Alternatively or additionally, in step 56, the software interface 42 may access the bus system 22 and may control the electronic device 24 in the vehicle 14 using the control command. This makes it possible to control an air-conditioning system, for example, in the vehicle 14.

In step 58, the mobile telephone application 46 compiles user elements for a graphical user interface.

In step 60, configuration data relating to the vehicle computer are retrieved for the graphical representation of the user elements via the software library 40. The configuration data are used by the mobile telephone application 46 to generate a graphical user interface on the basis of the configuration data using the application 46, which can be displayed on the display 26.

Alternatively or additionally, in step 62, the compiled user elements are transmitted by the software library 40 to the software interface 42. A graphical user interface of the application 46 with the compiled user elements is then displayed on the vehicle display 18, the user elements being represented using the configuration data relating to the vehicle computer 12.

In step 64, the user inputs user commands on the vehicle input apparatus 20. The user commands are transmitted from the software interface 42 to the software library 40 via the local network connection 30 and are transmitted to the mobile telephone application 46 by the software library 40. This makes it possible to remotely control the application 46 using the vehicle computer 12, its user interface then being able to be displayed on the display 18 of the vehicle computer.

It should also be pointed out that "comprising" does not exclude any other elements or steps and "one" does not exclude a multiplicity. It is also pointed out that features or steps which have been described with reference to one of the above exemplary embodiments can also be used in combination with other features or steps of other exemplary embodiments described above. Reference symbols in the claims should not be considered to be a restriction.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for controlling a vehicle computer (12) of a vehicle (14) using a mobile telephone (16), the vehicle computer (12) having a vehicle display (18) and a vehicle input device (20), and the mobile telephone (16) having a mobile telephone display (26) and a mobile telephone input device (28), the method comprising:

executing an application (46) on the mobile telephone (16);

assembling user elements by the application (46) for a graphical user interface of the application (46);

inputting, by a user, a control command for the vehicle (14) into the application (46) with the mobile telephone input device (28);

executing, by the application (46), a software library (40) usable by a plurality of applications;

connecting a software interface (42), for the software library (40), in the vehicle computer (12) to the mobile telephone (16) via a local network connection (30);

sending the control command to the software interface (42);

executing the control command by the vehicle computer (12);

retrieving design data from the vehicle computer (12) for the graphic representation of the user elements used by the mobile telephone application (46) by the software library (40) via the local network connection (30); and generating a graphical user interface based on the design data supplied by the vehicle computer by the application (46).

2. The method according to claim 1, further comprising:

controlling an application (44) in the vehicle computer (12) with the control command by the software interface (42).

3. The method according to claim 1, further comprising:

accessing, through the software interface (42), a vehicle bus system (22) used by the vehicle computer (12); and controlling an electronic device (24) in the vehicle (14) connected to the vehicle bus system (22) with the control command.

4. The method according to claim 1, further comprising:

retrieving diagnostic data from an electronic device (24) of the vehicle (14) via the software interface (42);

sending the diagnostic data from the software interface (42) to the software library (40) via the local network connection (30); and providing the diagnostic data by the software library (40) for the application (46).

5. The method according to claim 1, further comprising:

sending compiled user elements to the software interface (42) of the vehicle computer (12) through the software library (40); and displaying a graphical user interface of the application (46) on the vehicle display (18) with the assembled user elements, user elements being represented by the design data of the vehicle computer (12).

6. The method according to claim 1, further comprising:

inputting user commands on the vehicle input device (20) by a user;

sending the user commands from the software interface (42) to the software library (40) via the local network connection (30); and transmitting the user commands to the mobile telephone application (46) through the software library (40).

7. A non-transitory computer-readable medium storing a computer program for controlling a vehicle (14), which, when executed on processors of a mobile telephone (16) and of a vehicle computer (12), carries out the steps of the method as claimed in claim 1.

* * * * *